(12) United States Patent
Hirao et al.

(10) Patent No.: US 10,937,593 B2
(45) Date of Patent: Mar. 2, 2021

(54) CERAMIC ELECTRONIC COMPONENT AND METHOD OF MANUFACTURING CERAMIC ELECTRONIC COMPONENT

(71) Applicant: Murata Manufacturing Co., Ltd., Nagaokakyo (JP)

(72) Inventors: Takahiro Hirao, Nagaokakyo (JP); Takashi Ohara, Nagaokakyo (JP); Shu Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/666,560

(22) Filed: Oct. 29, 2019

(65) Prior Publication Data

US 2020/0135396 A1    Apr. 30, 2020

(30) Foreign Application Priority Data

Oct. 30, 2018    (JP) .............................. JP2018-203738

(51) Int. Cl.
| | |
|---|---|
| *H01G 4/012* | (2006.01) |
| *H01G 4/12* | (2006.01) |
| *H01G 4/33* | (2006.01) |
| *H01G 4/40* | (2006.01) |
| *H01H 85/02* | (2006.01) |
| *H01H 85/12* | (2006.01) |

(52) U.S. Cl.
CPC .............. *H01G 4/12* (2013.01); *H01G 4/012* (2013.01); *H01G 4/33* (2013.01); *H01G 4/40* (2013.01); *H01H 85/0241* (2013.01); *H01H 85/12* (2013.01)

(58) Field of Classification Search
CPC ...... H01H 85/12; H01H 85/0241; H01G 4/12; H01G 4/33; H01G 4/40
See application file for complete search history.

(56) References Cited

U.S. PATENT DOCUMENTS

| | | | |
|---|---|---|---|
| 4,894,746 A | * | 1/1990 | Mori ........................ H01G 2/14 361/275.4 |
| 9,293,913 B2 | * | 3/2016 | Umeda .................. H02H 9/044 |

(Continued)

FOREIGN PATENT DOCUMENTS

| | | |
|---|---|---|
| JP | 53-311716 A | 12/1988 |
| JP | 02-153513 A | 6/1990 |

(Continued)

*Primary Examiner* — Nathan Milakovich
(74) *Attorney, Agent, or Firm* — Keating & Bennett, LLP

(57) ABSTRACT

A ceramic electronic component includes a stack including ceramic layers and internal electrodes stacked alternately, and external electrodes provided on a surface of the stack and electrically connected to the internal electrodes. The internal electrodes include a melting trigger portion that melts earlier than any other portion. The ceramic layer adjacent to the internal electrode including the melting trigger portion includes a cavity. The cavity is provided at a position at which the cavity overlaps the melting trigger portion at least partially in a stacking direction of the internal electrodes. The cavity is open on a melting trigger portion side. A surface of at least one of the stack and the external electrodes is provided with an identifier that serves as a marker indicating use of the ceramic electronic component with the cavity vertically below the melting trigger portion.

15 Claims, 11 Drawing Sheets

(56) References Cited

U.S. PATENT DOCUMENTS

| | | | |
|---|---|---|---|
| 9,667,036 B2* | 5/2017 | Ishikawa | H01T 4/12 |
| 2006/0158827 A1 | 7/2006 | Lee et al. | |
| 2014/0022696 A1 | 1/2014 | Banno et al. | |
| 2018/0137977 A1* | 5/2018 | Vaughan | H01G 4/2325 |
| 2018/0337002 A1* | 11/2018 | Bultitude | H01G 4/258 |
| 2019/0043669 A1* | 2/2019 | Trinh | H01G 4/012 |

FOREIGN PATENT DOCUMENTS

| | | |
|---|---|---|
| JP | 03-44910 A | 2/1991 |
| JP | 2006-203165 A | 8/2006 |
| WO | 2012/132684 A1 | 10/2012 |

* cited by examiner

CERAMIC ELECTRONIC COMPONENT AND METHOD OF MANUFACTURING CERAMIC ELECTRONIC COMPONENT

CROSS REFERENCE TO RELATED APPLICATIONS

This application claims the benefit of priority to Japanese Patent Application No. 2018-203738 filed on Oct. 30, 2018. The entire contents of this application are hereby incorporated herein by reference.

BACKGROUND OF THE INVENTION

1. Field of the Invention

The present invention relates to a ceramic electronic component and a method of manufacturing a ceramic electronic component.

2. Description of the Related Art

A conventionally known ceramic electronic component includes a stack including ceramic layers and internal electrodes alternately stacked, and external electrodes provided on surfaces of the stack and electrically connected to the internal electrodes. One example of such a ceramic electronic component is a multilayer ceramic capacitor.

WO 2012/132684 describes a ceramic electronic component including internal electrodes provided with narrow portions having a small width. When a short-circuit occurs between internal electrodes adjacent to each other in the stacking direction, overcurrent flows through the narrow portions, and the narrow portions melt, leading to disconnection of the narrow portions.

In the ceramic electronic component described in WO 2012/132684, however, when the narrow portions of the internal electrodes melt, the melted and separated portions may be rendered conductive, leading to another short-circuit. Also, a small distance between the separated portions may lead to an electric discharge occurring at the portion of separation.

SUMMARY OF THE INVENTION

Preferred embodiments of the present invention provide ceramic electronic components that each, at the occurrence of a short-circuit between internal electrodes, can ensure security by melting a portion of the internal electrode and preventing another conduction and an electric discharge from occurring at the melted portion, and also provide methods of manufacturing the ceramic electronic components.

A ceramic electronic component according to a preferred embodiment of the present invention includes a stack including a plurality of ceramic layers and a plurality of internal electrodes stacked alternately, and a plurality of external electrodes provided on a surface of the stack and electrically connected to the internal electrodes. Each of the internal electrodes includes a melting trigger portion that melts earlier than any other portion of the internal electrodes. Each of the ceramic layers adjacent to a corresponding one of the internal electrodes including the melting trigger portion includes a cavity. The cavity is provided at a position at which the cavity overlaps the melting trigger portion at least partially in a stacking direction of the internal electrodes, and is open on a melting trigger portion side. A surface of at least one of the stack and the external electrodes is provided with an identifier that defines and functions as a marker indicating use of the ceramic electronic component with the cavity vertically below the melting trigger portion.

The stack may include a first main surface and a second main surface extending in a length direction and a width direction, a first lateral surface and a second lateral surface extending in the length direction and the stacking direction, and a first end surface and a second end surface extending in the width direction and the stacking direction. The internal electrodes may include a first internal electrode drawn out to the first end surface, and a second internal electrode drawn out to the second end surface. The external electrodes may include a first external electrode provided on the first end surface and electrically connected to the first internal electrode, and a second external electrode provided on the second end surface and electrically connected to the second internal electrode. The melting trigger portion may be provided at a position at which the first internal electrode and the second internal electrode do not overlap each other in the stacking direction.

The melting trigger portion of each of the internal electrodes may be a thin portion that is thinner than any other portion of the internal electrodes.

Each of the internal electrodes may be provided with a groove extending in a width direction, and the thin portion may be provided at a position at which the groove is provided.

The internal electrode may include a groove extending in the width direction. The groove may include a first portion having a depth the same or substantially the same as a thickness of each of the internal electrodes and a second portion having a depth smaller than the thickness of each of the internal electrodes. The thin portion may be provided at the second portion.

The melting trigger portion of each of the internal electrodes may be made of a material having a melting point lower than that of any other portion of the internal electrodes.

A surface of each of the ceramic layers defining the cavity may have a curved shape.

Each of the ceramic layers may be a ceramic dielectric layer. The ceramic electronic component may be a multilayer ceramic capacitor.

A method of manufacturing a ceramic electronic component according to a preferred embodiment of the present invention includes producing an unfired stack by ink-jet printing and firing the produced unfired stack to produce the stack. The method includes forming, by printing with ink to make a ceramic layer, an unfired ceramic layer that turns into the ceramic layer after firing, forming, by printing with ink to make an internal electrode, an unfired internal electrode layer that turns into the internal electrode after firing such that the unfired internal electrode layer includes a portion that turns into the melting trigger portion after firing, and forming, by printing with disappearing ink, a disappearing portion on the portion of the unfired internal electrode layer that turns into the melting trigger portion after firing, the disappearing ink including a disappearing material that disappears by firing. The formation of the unfired ceramic layer, the formation of the unfired internal electrode layer, and the formation of the disappearing portion are repeated to produce the unfired stack, and the produced unfired stack is fired to produce the stack.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below, and features of the preferred embodiments of the present invention will be described specifically. A multilayer ceramic capacitor will be described below as an example a ceramic electronic component according to the present invention. The ceramic electronic component is, however, not limited to the multilayer ceramic capacitor and may be, for example, an inductor or a thermistor, or a ceramic composite component including a ceramic electronic component, such as an LC filter or a module substrate.

Preferred Embodiment 1

Figure 1:
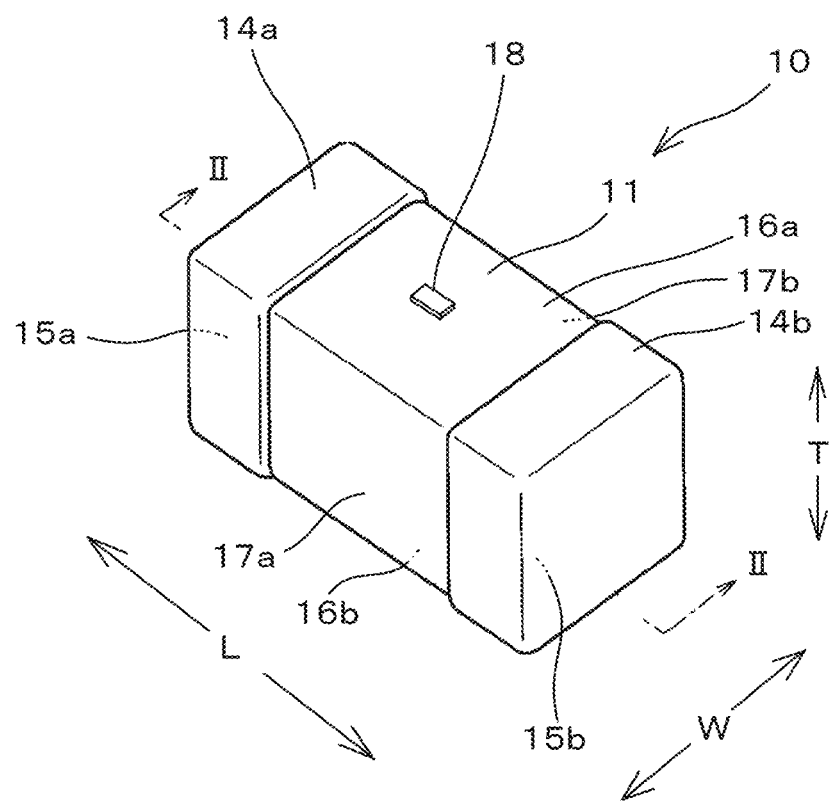
FIG. 1 is a perspective view of a multilayer ceramic capacitor according to a Preferred Embodiment 1 of the present invention.
Figure 2:
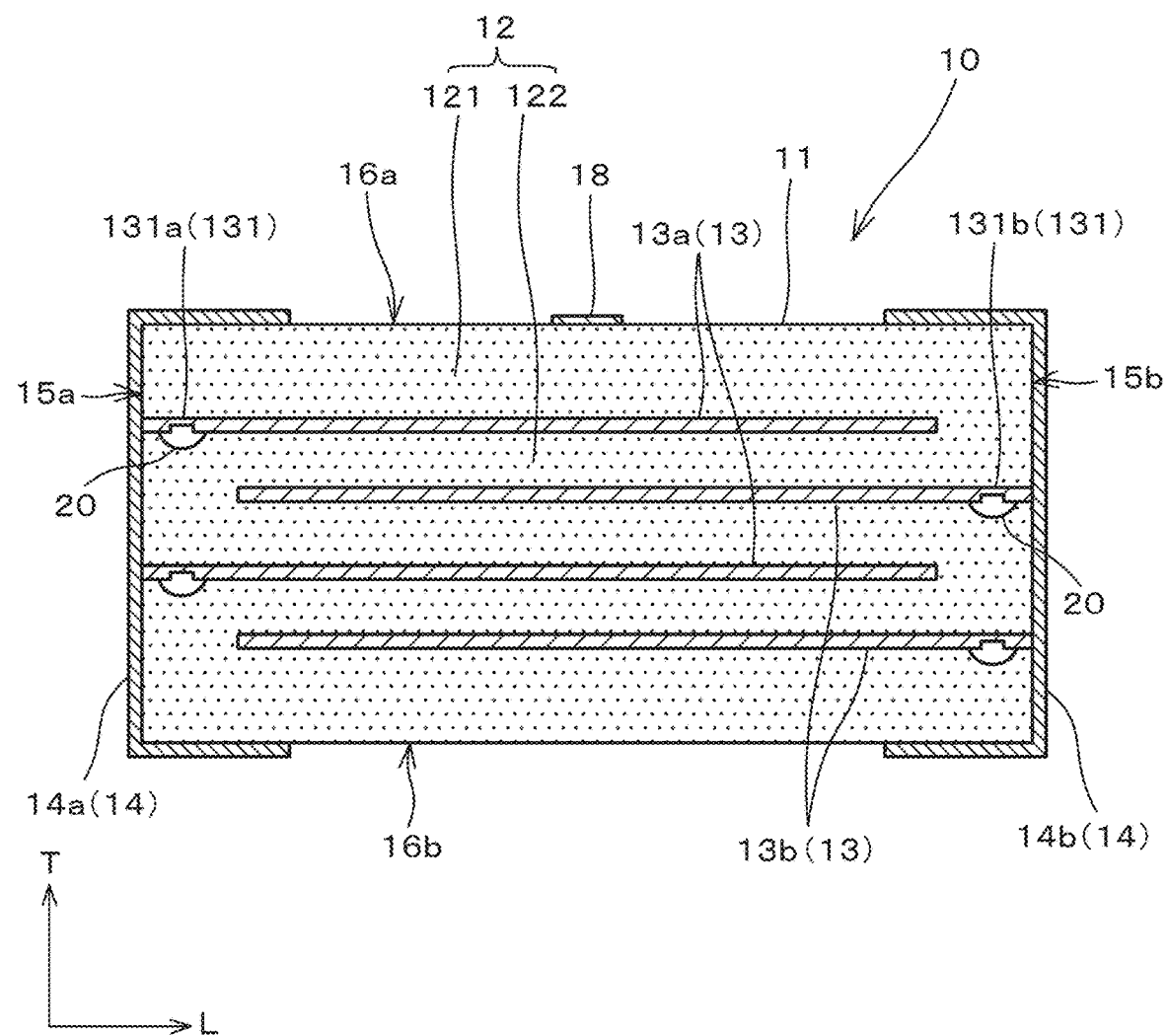
FIG. 2 is a sectional view of the multilayer ceramic capacitor, which is taken along the line II-II in FIG. 1.

FIG. 1 is a perspective view of a multilayer ceramic capacitor 10 according to a Preferred Embodiment 1 of the present invention. FIG. 2 schematically shows a cross-section of multilayer ceramic capacitor 10, which is taken along the line II-II in FIG. 1.

As shown in FIGS. 1 and 2, a multilayer ceramic capacitor preferably is a ceramic electronic component having a rectangular or substantially rectangular parallelepiped shape in its entirety, and includes a stack 11 and a pair of external electrodes 14 (14a, 14b). The pair of external electrodes 14 are disposed to face each other as shown in FIG. 1.

Herein, the direction in which the pair of external electrodes 14 face each other is defined as a length direction L of multilayer ceramic capacitor 10, the direction in which internal electrodes 13 (13a, 13b), which will be described below, are stacked is defined as a stacking direction T, and the direction orthogonal or substantially orthogonal to both of length direction L and stacking direction T is defined as a width direction W.

The stack 11 includes a first end surface 15a and a second end surface 15b facing each other in length direction L, a first main surface 16a and a second main surface 16b facing each other in stacking direction T, and a first lateral surface 17a and a second lateral surface 17b facing each other in width direction W.

The first end surface 15a and second end surface 15b extend in width direction W and stacking direction T. The first main surface 16a and the second main surface 16b extend in length direction L and width direction W. The first lateral surface 17a and second lateral surface 17b extend in length direction L and stacking direction T.

Although FIG. 2 shows the stack 11 with no rounded corners, it is preferable that the stack 11 has rounded corners and rounded ridge portions. Herein, the corner is a portion at which three surfaces of the stack 11 meet together, and the ridge portion is a portion at which two surfaces of the stack 11 meet together.

The first external electrode 14a is preferably provided over the entire or substantially the entire first end surface 15a of stack 11 and also extends on first main surface 16a, second main surface 16b, first lateral surface 17a, and second lateral surface 17b from first end surface 15a. The first external electrode 14a is electrically connected to first internal electrode 13a.

The second external electrode 14b is preferably provided over the entire or substantially the entire second end surface 15b of stack 11 and extends on the first main surface 16a, second main surface 16b, first lateral surface 17a, and second lateral surface 17b from second end surface 15b. The second external electrode 14b is electrically connected to second internal electrode 13b.

The first external electrode 14a and second external electrode 14b each preferably include, for example, metal such as Ni, Cu, Ag, Pd, Au, Ti, and Cr, and an alloy mainly made of such metals. The first external electrode 14a and second external electrode 14b may each further include a plating layer.

As shown in FIG. 2, the stack 11 includes a ceramic dielectric layer 12, a first internal electrode 13a, and a second internal electrode 13b. Although FIG. 2 shows two first internal electrodes 13a and two second internal electrodes 13b, the number of these internal electrodes is not limited to two.

The ceramic dielectric layer 12 preferably includes an external-layer ceramic dielectric layer 121, which is located on the outer side of stack 11 in the stacking direction, and an internal-layer ceramic dielectric layer 122, which is located between first internal electrode 13a and second internal electrode 13b. Ceramic dielectric layer 12 preferably includes dielectric ceramic mainly made of, for example, barium titanate ($BaTiO_3$). The internal-layer ceramic dielectric layer 122 preferably has a thickness of, for example, about 0.3 µm or more and about 1.0 µm or less.

The first internal electrode 13a has a plate shape and is drawn out to first end surface 15a of stack 11. The second internal electrode 13b has a plate shape and is drawn out to second end surface 15b of stack 11. The first internal electrodes 13a and second internal electrodes 13b extend in length direction L and width direction W and are disposed alternately with internal-layer ceramic dielectric layer 122 therebetween in stacking direction T.

The first internal electrode 13a includes an opposing electrode portion opposing second internal electrode 13b and a drawn-out electrode portion drawn out from the opposing electrode portion to first end surface 15a of stack 11. The second internal electrode 13b includes an opposing electrode portion opposing first internal electrode 13a and a drawn-out electrode portion drawn out from the opposing electrode portion to second end surface 15b of stack 11.

The opposing electrode portion of first internal electrode 13a and the opposing electrode portion of second internal electrode 13b oppose each other with an internal-layer ceramic dielectric layer 122 therebetween to provide a capacitance, and the capacitance defines and functions as a capacitor.

The first internal electrode 13a and second internal electrode 13b each preferably include, for example, metal such as Ni, Cu, Ag, Pd, and Au, or an alloy of Ag and Pd. The first internal electrode 13a and second internal electrode 13b may further include dielectric particles having the same composition as that of the ceramic contained in ceramic dielectric layer 12.

The first internal electrode 13a preferably includes a melting trigger portion that melts earlier than any other portion when a short-circuit occurs between first internal electrode 13a and second internal electrode 13b. In the present preferred embodiment, the first internal electrode 13a includes, as the melting trigger portion, a first thin portion 131a thinner than any other portion in stacking direction T. In the present preferred embodiment, first thin portion 131a is provided at the drawn-out electrode portion of first internal electrode 13a, that is, at a position at which first internal electrode 13a does not overlap second internal electrode 13b in stacking direction T.

The second internal electrode 13b includes a melting trigger portion that melts earlier than any other portion when a short-circuit occurs between second internal electrode 13b and first internal electrode 13a. In the present preferred embodiment, the second internal electrode 13b preferably includes, as the melting trigger portion, a second thin portion 131b thinner than any other portion in stacking direction T. In the present preferred embodiment, the second thin portion 131b is preferably provided at the drawn-out electrode portion of second internal electrode 13b, that is, at a position at which second internal electrode 13b does not overlap the first internal electrode 13a in stacking direction T.

In the following description, the first internal electrode 13a and second internal electrode 13b may be collectively referred to as an internal electrode 13, and the first thin portion 131a and second thin portion 131b may be collectively referred to as a thin portion 131.

Portions of the internal electrode 13 other than thin portion 131 preferably has a thickness of, for example, about 0.2 μm or more and about 0.7 μm or less. The ratio of the thickness of thin portion 131 to the thickness of the portion other than thin portion 131 is preferably, for example, about 10% or more and about 50% or less. The dimension of thin portion 131 in length direction L is preferably, for example, about 5 μm or more and about 20 μm or less.

Figure 3:
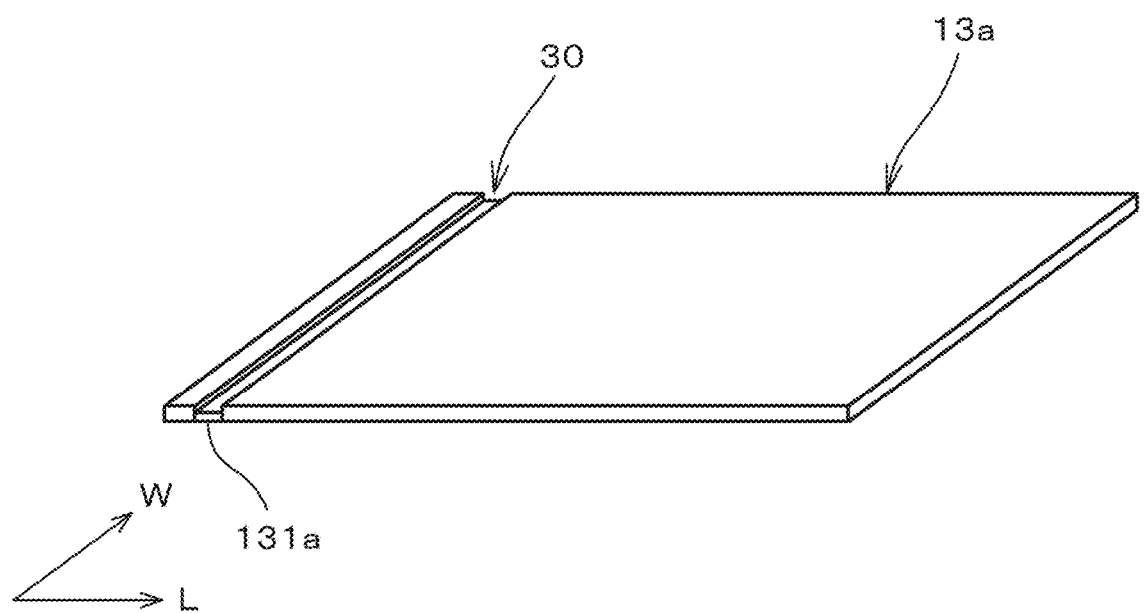
FIG. 3 is a perspective view showing a shape of a first internal electrode according to a preferred embodiment of the present invention.

FIG. 3 is a perspective view showing the shape of first internal electrode 13a. Although the shape of first internal electrode 13a is described herein, the same preferably applies to the shape of second internal electrode 13b.

As shown in FIG. 3, a groove 30 is provided from one end to the other end of first internal electrode 13a in width direction W. The groove 30 has a constant or substantially constant depth irrespective of positions. The first internal electrode 13a has a smaller thickness at a position at which groove 30 is provided than at a position at which the groove 30 is not provided. That is to say, the first thin portion 131a is defined at the position at which groove 30 is provided.

In the present preferred embodiment, the thin portion 131 extends linearly in width direction W. Note that the thin portion 131 may extend diagonally at a predetermined angle to width direction W, or may extend in an appropriate curve.

Figure 4:
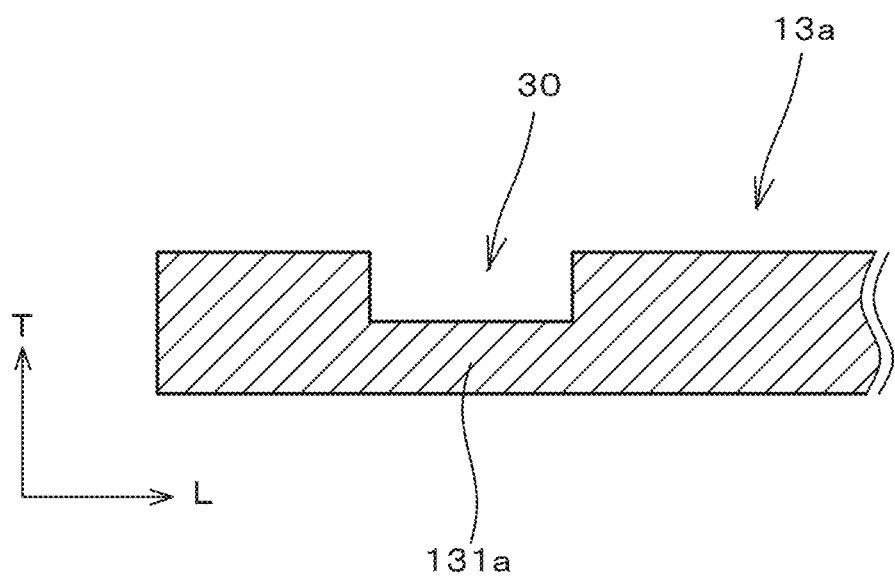
FIG. 4 shows a cross-sectional shape of a groove in the L-T cross-section according to a preferred embodiment of the present invention.

FIG. 4 shows a cross-sectional shape of the groove 30 in the L-T cross-section. As shown in FIG. 4, the groove 30 preferably has a rectangular or substantially rectangular cross-sectional shape in the L-T cross-section.

Figure 5A:
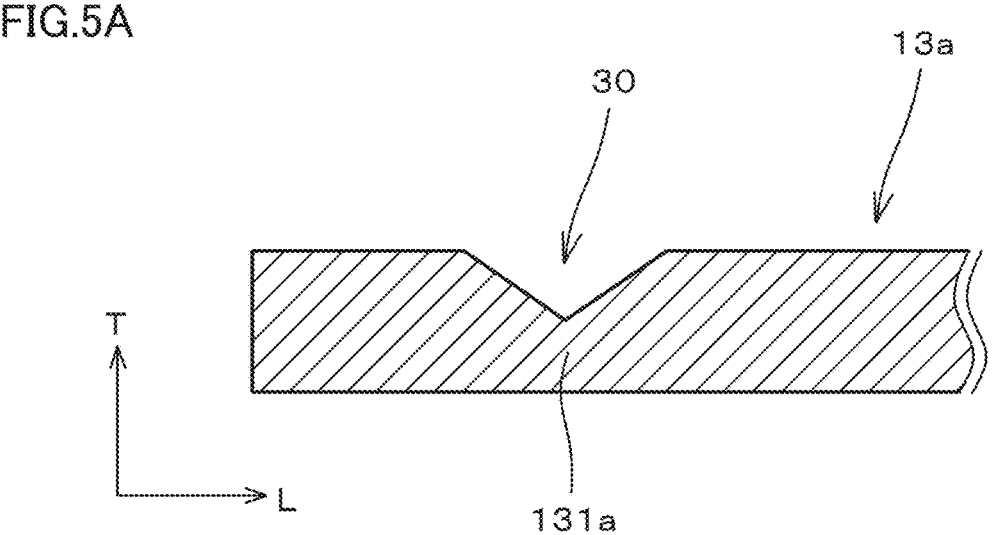
FIGS. 5A to 5C each show a modification of the cross-sectional shape of the groove in the L-T cross-section.
Figure 5B:
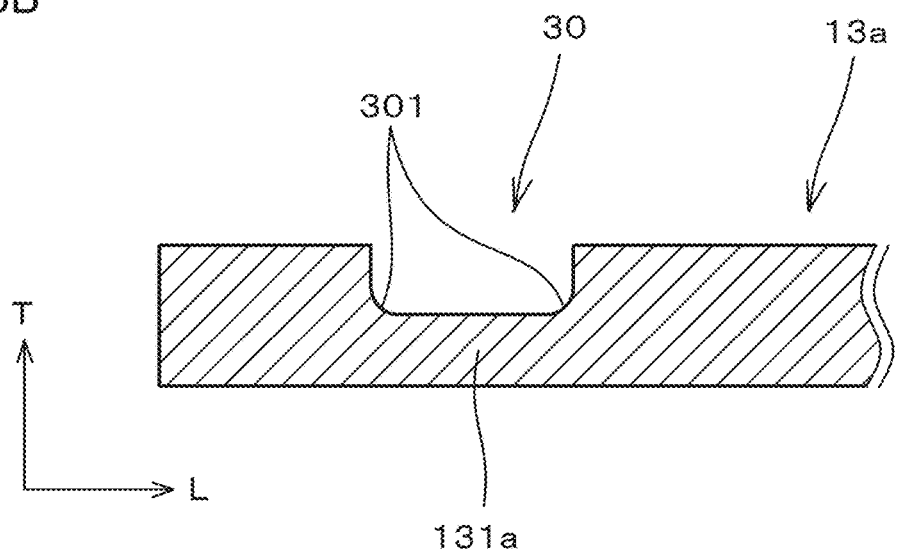
Figure 5C:
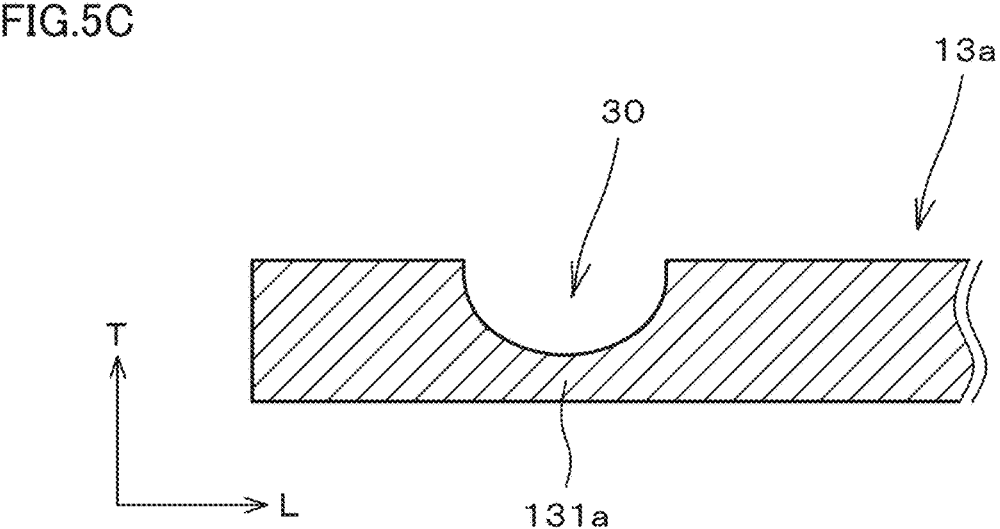

Note that the cross-sectional shape of the groove 30 in the L-T cross-section is not limited to the rectangular or substantially rectangular shape. FIGS. 5A to 5C each show a modification of the cross-sectional shape of the groove 30 in the L-T cross-section. FIG. 5A shows an example in which the cross-section of the groove 30 has the shape of an inverted triangle in which the dimension in length direction L gradually decreases from the surface toward the inside of the first internal electrode 13a. FIG. 5B shows an example in which the lateral surfaces and the bottom surface of the groove 30 are flat and a ridge portion 301 between the lateral surface and the bottom surface is rounded. FIG. 5C shows an example in which the lateral surfaces of the groove 30 have a flat shape and the bottom surface of the groove 30 has an arc shape. Also in the example shown in FIG. 5C, the ridge portion between the bottom surface and the lateral surface of the groove 30 is rounded.

The ridge portion between the bottom surface and the lateral surface of the groove 30 being rounded refers to the bottom surface and the lateral surface of the groove being connected to each other by a ridge portion with a curved surface.

Each of the internal-layer ceramic dielectric layer 122 and external-layer ceramic dielectric layer 121 that are adjacent to internal electrode 13 having thin portion 131 preferably includes a cavity 20. The cavity 20 is provided at a position at which the cavity 20 overlaps the thin portion 131 at least partially in stacking direction T and is open on the thin portion 131 side.

As described above, in the present preferred embodiment, the groove 30 is provided from one end to the other end of internal electrode 13 in width direction W, and the thin portion 131 is provided at the position at which the groove 30 is provided. As seen in stacking direction T, the cavity 20 extends in a width direction W at least at the position at which the thin portion 131 is provided, similarly to thin portion 131.

The dimension of cavity 20 in length direction L is preferably, for example, about 10 μm or more and about 30 μm or less. The dimension of cavity 20 in stacking direction T is preferably, for example, about 0.1 μm or more and about 0.4 μm or less.

A surface of ceramic dielectric layer 12 which defines cavity 20 preferably has a curved shape. That is to say, the surface of ceramic dielectric layer 12, which defines cavity 20, has no corners, thus reducing or preventing the occurrence of a crack. For example, when acoustic noise occurs in multilayer ceramic capacitor 10, a crack may occur at a corner in the configuration including corners. However, the multilayer ceramic capacitor 10 in the present preferred embodiment has no corners, thus reducing or preventing the occurrence of a crack.

The multilayer ceramic capacitor 10 in the present preferred embodiment is used with cavity 20 vertically below thin portion 131 of internal electrode 13. The surface of at least one of stack 11 and external electrode 14 is provided with an identifier 18 defining and functioning as a marker that indicates use of the multilayer ceramic capacitor 10 with cavity 20 vertically below thin portion 131 of internal electrode 13.

In the present preferred embodiment, the identifier 18 is provided on first main surface 16a of stack 11. That is to say, the multilayer ceramic capacitor 10 is mounted for use such that the first main surface 16a on which the identifier 18 is provided is the upper side and the second main surface 16b is the lower side. The identifier 18 reliably allows the use of the multilayer ceramic capacitor 10 with the cavity 20 vertically below thin portion 131 of internal electrode 13.

Since the identifier 18 is provided to identify the positional relationship between the cavity 20 and the thin portion 131 of the internal electrode 13 in the stacking direction T, the shapes and materials of the identifier 18 are not particularly limited. Also, the position at which the identifier 18 is provided is not limited to the first main surface 16a of the stack 11, and may be provided on the second main surface 16b or on the first external electrode 14a or second external electrode 14b.

In the multilayer ceramic capacitor 10 having the above configuration, when a short-circuit occurs between the first internal electrode 13a and second internal electrode 13b adjacent to each other in stacking direction T, overcurrent flows through the thin portion 131 of the internal electrode 13 to increase the temperature of thin portion 131. Consequently, the thin portion 131 melts earlier than any other portion. This causes disconnection between the first internal electrode 13a and second internal electrode 13b.

Figure 6A:
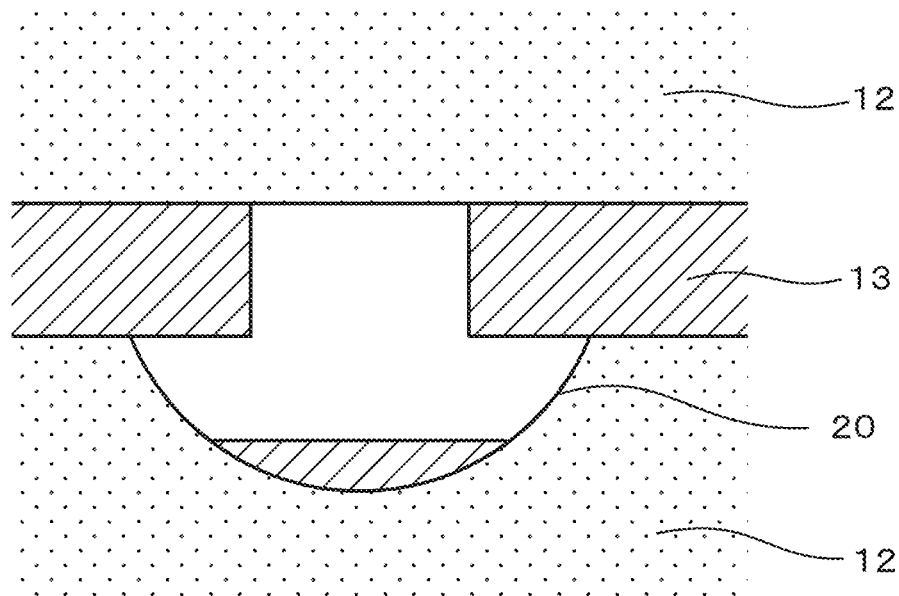
FIG. 6A shows a state in which a thin portion of the internal electrode of the multilayer ceramic capacitor according a preferred embodiment of to the present invention is melted.

When the thin portion 131 of internal electrode 13 melts, the melted portion drops into the cavity 20 located vertically below thin portion 131 (see FIG. 6A). This can increase the distance between separated portions of the internal electrode 13 at the position of melting, thus preventing the separated portions from becoming conductive again. Also, the increased distance between the separated portions of the internal electrode 13 at the position of melting can prevent the occurrence of an electric discharge at the position of melting.

Figure 6B:
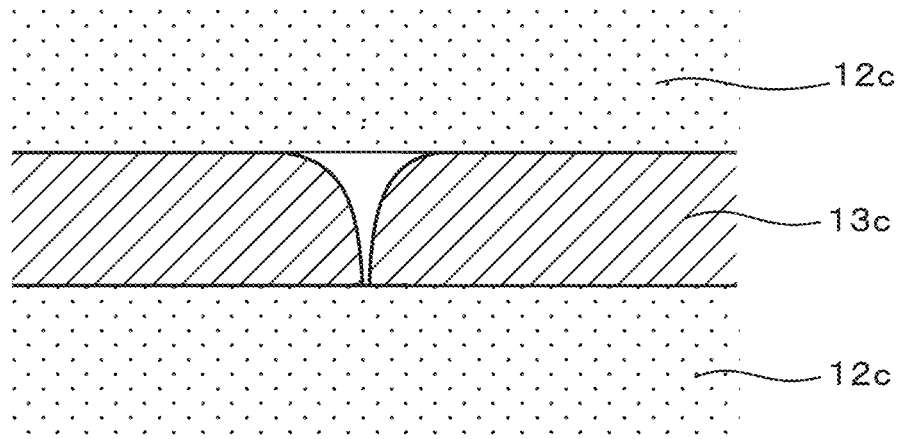
FIG. 6B shows a state in which a portion of an internal electrode of a conventional multilayer ceramic capacitor with no cavity in a ceramic dielectric layer is melted.

In contrast, a conventional multilayer ceramic capacitor with no cavity in ceramic dielectric layer 12C has a small distance between separated portions at the position of melting even when part of internal electrode 13C melts, as shown in FIG. 6B, leading to a problem that another conduction or an electric discharge may occur at the position of melting.

In multilayer ceramic capacitor 10 in the present preferred embodiment, for example, if acoustic noise caused by vibrations is loud, the thin portion 131 of the internal electrode 13 is broken. Also in that case, the broken portion drops into the cavity 20 located vertically below the thin portion 131.

The multilayer ceramic capacitor 10 in the present preferred embodiment has an area of the internal electrode 13 which is the same or substantially the same as that of the configuration devoid of thin portion 131, thus reducing or preventing a significant decrease in the capacitance of the capacitor.

Although the thin portion 131 of the internal electrode 13 can be provided at any position, it is preferable that the thin portion 131 is provided at a position at which the first internal electrode 13a and second internal electrode 13b do not overlap each other in the stacking direction T as in the present preferred embodiment.

When the thin portion 131 is provided at a position at which the first internal electrode 13a and second internal electrode 13b overlap each other in the stacking direction T and the cavity 20 is in contact with each of the first internal electrode 13a and second internal electrode 13b located on the opposite sides in the stacking direction T, a short-circuit may occur again between the first internal electrode 13a and second internal electrode 13b because of a drop of a melted portion of the internal electrode 13 into cavity 20. In the multilayer ceramic capacitor 10 in the present preferred embodiment, however, the thin portion 131 is preferably provided at the position at which the first internal electrode 13a and second internal electrode 13b do not overlap each other in the stacking direction T. Thus, when the melted portion of the internal electrode 13 drops into the cavity 20, the occurrence of a short-circuit as described above can be reduced or prevented.

Method of Manufacturing Multilayer Ceramic Capacitor

A method of manufacturing multilayer ceramic capacitor 10 according to a preferred embodiment of the present invention will be described with reference to FIGS. 7A to 7C to FIGS. 9A to 9C. Described here is an example in which an unfired stack is produced by ink-jet printing, and the produced unfired stack is fired to produce stack 11, thus manufacturing multilayer ceramic capacitor 10.

A method of manufacturing multilayer ceramic capacitor will be described by way of example, in which a resultant multilayer ceramic capacitor 10 preferably has a dimension of about 1.0 mm in length direction L, a dimension of about 0.5 mm in width direction W, and a dimension of about 0.5 mm in stacking direction T. In the multilayer ceramic capacitor 10, the internal electrode 13 preferably has a thickness of about 0.5 µm, and the internal-layer ceramic dielectric layer 122 preferably has a thickness of about 0.6 µm.

Figure 7A:
FIGS. 7A to 7C show some of steps used in manufacturing a multilayer ceramic capacitor according to a preferred embodiment of the present invention.

First, an unfired external-layer ceramic dielectric layer 121M, which turns into the external-layer ceramic dielectric layer 121 after firing, is produced with ink used in making the dielectric layer 61 (see FIG. 7A). Specifically, ink making the dielectric layer 61 is discharged from an inkjet head of printing unit a printing unit 60, and printing for one layer is performed. Subsequently, a drying step is repeated, thus producing unfired external-layer ceramic dielectric layer 121M.

Ink used in making the dielectric layer 61 preferably includes, for example, dielectric ceramic particles mainly made of barium titanate ($BaTiO_3$), an organic solvent, a dispersant, and a binder. The discharge amount of ink for dielectric layer 61 is preferably, for example, about 1 pl. The printing speed is preferably, for example, about 100 mm/s.

Figure 7B:
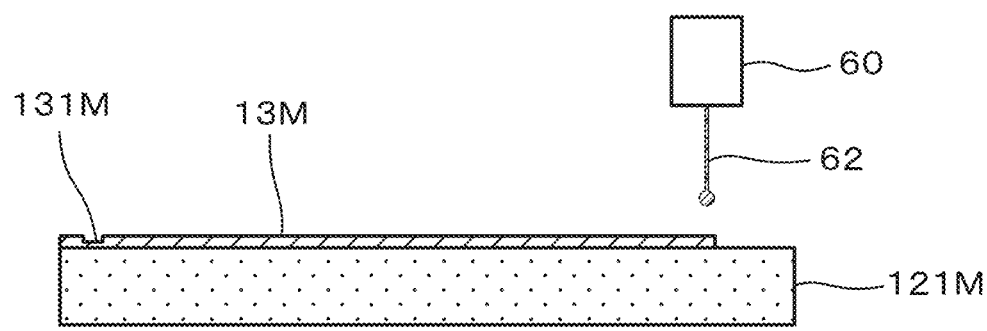

Subsequently, printing is performed with ink used in making the internal electrode 62, and then, the ink is dried, thus forming an unfired internal electrode layer 13M (see FIG. 7B). Ink used in making the internal electrode 62 preferably includes, for example, an organic solvent, a dispersant, a binder, and particles of metal such as Ni, Cu, Ag, Pd, Au, Ti, and Cr or an alloy mainly made of these metals. The unfired internal electrode layer 13M is a layer that turns into first internal electrode 13a or second internal electrode 13b after firing. Thus, the unfired internal electrode layer 13M is formed from one end side in length direction L so as not to extend to the other end side in length direction L.

As described above, the internal electrode 13 preferably includes a thin portion 131 that is thinner than any other portion of the internal electrode 13. In the formation of the unfired internal electrode layer 13M, thus, the unfired thin portion 131M, which turns into the thin portion 131 after firing and is thinner than any other portion, is produced. The unfired thin portion 131M is produced with a smaller amount of ink that lands in the unfired thin portion 131M than in any other portion.

Figure 7C:
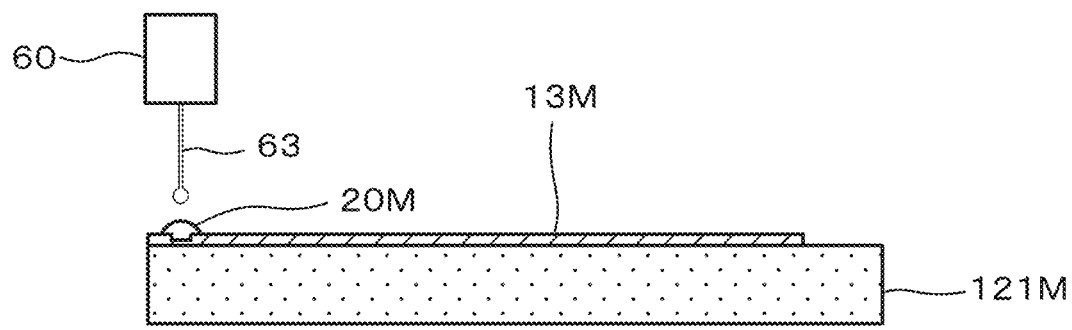

Subsequently, printing is performed with disappearing ink 63, and then, the ink is dried, thus forming a disappearing portion 20M (see FIG. 7C). The disappearing portion 20M is formed above the unfired thin portion 131M of the unfired internal electrode layer 13M.

The disappearing ink 63 preferably includes, for example, an organic solvent, a dispersant, a binder, and a disappearing material. The disappearing material is a material that disappears by pyrolysis occurring at a temperature lower than a peak temperature (e.g., about 1000° C.) during firing, for example, about 500° C. The disappearing material may preferably be, for example, carbon or pyrolysis resin. That is to say, the disappearing portion 20M disappears through a following firing process, thereby forming cavity 20.

Figure 8A:
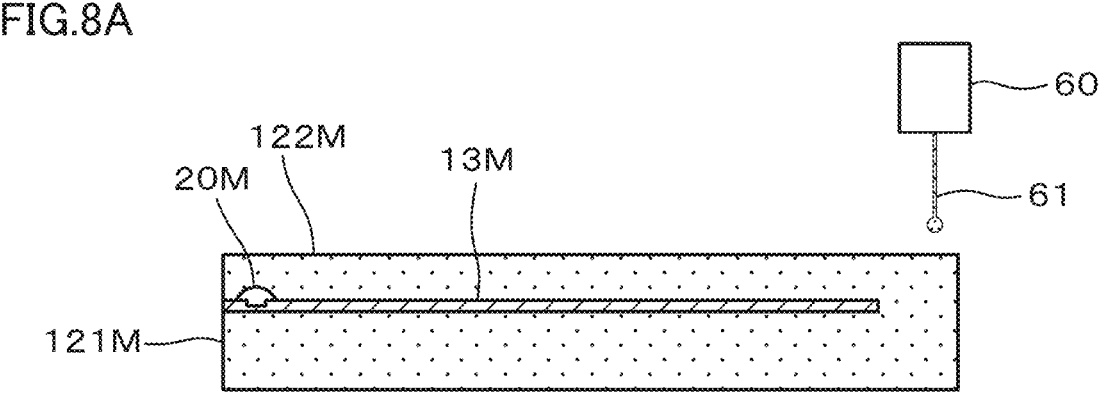
FIGS. 8A to 8C show some of the steps used in manufacturing a multilayer ceramic capacitor, which show steps subsequent to the steps shown in FIGS. 7A to 7C.
Figure 8B:
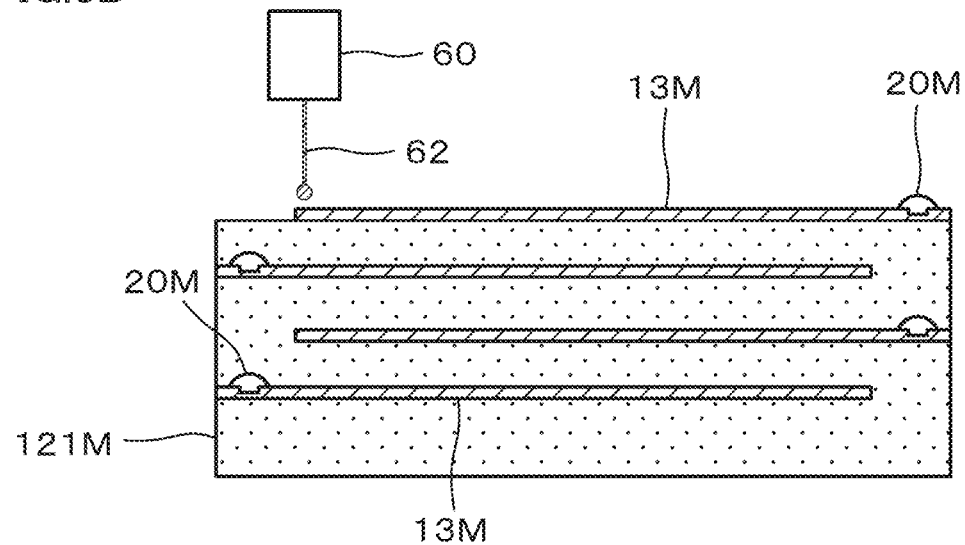

Subsequently, printing is performed with ink used to make the dielectric layer 61, and then, the ink is dried, thus forming an unfired internal-layer ceramic dielectric layer 122M that turns into the internal-layer ceramic dielectric layer 122 after firing (see FIG. 8A).

Subsequently, the steps described with reference to FIGS. 7B to 8A are repeated (see FIG. 8B). Note that the unfired internal electrode layers 13M are formed with ink used in making the internal electrode 62 such that a layer that turns into the first internal electrode 13a after firing and a layer that turns into the second internal electrode 13b after firing are formed alternately.

After the formation of a predetermined number of layers that turn into the first internal electrodes 13a after firing and a predetermined number of layers turning into the second internal electrodes 13b after firing, an unfired external dielectric layer is further formed thereon, thus producing an unfired stack.

Figure 8C:
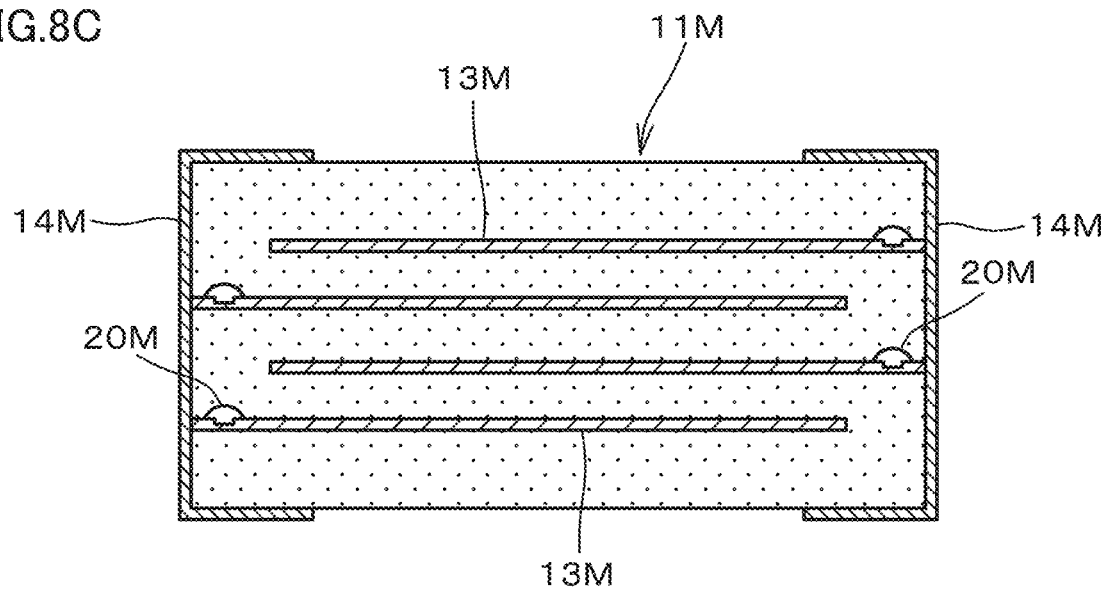

Subsequently, an external electrode paste is applied to the opposite end surfaces of an unfired stack 11M, thus forming the unfired external electrodes 14M (see FIG. 8C). The external electrode paste preferably includes, for example, an organic solvent, a dispersant, a binder, metal such as Ni, Cu, Ag, Pd, Au, Ti, and Cr or an alloy mainly made of such metals. The external electrode paste may be applied by, for example, dipping.

Subsequently, the unfired stack 11M with the unfired external electrodes 14M formed thereon is fired. The firing temperature is preferably, for example, about 1000° C. After firing, the unfired internal electrode layers 13M turn into the first internal electrodes 13a and second internal electrodes 13b, and the unfired external electrodes 14M turn into the first external electrode 14a and the second external electrode 14b. The disappearing portions 20M formed with the disappearing ink 63 disappear, so that the cavities 20 are formed (see FIG. 9A).

Figure 9A:
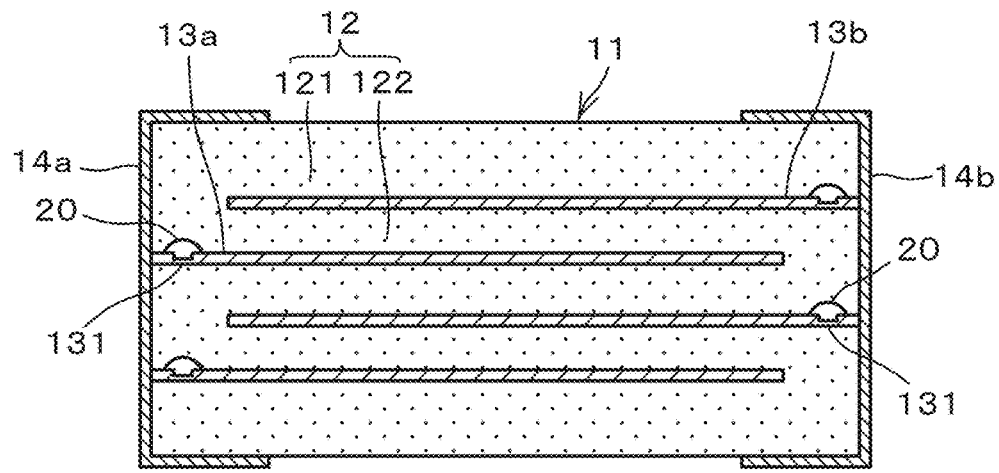
FIGS. 9A to 9C show some of the steps used in manufacturing a multilayer ceramic capacitor, which show steps subsequent to the steps shown in FIGS. 8A to 8C.
Figure 9B:
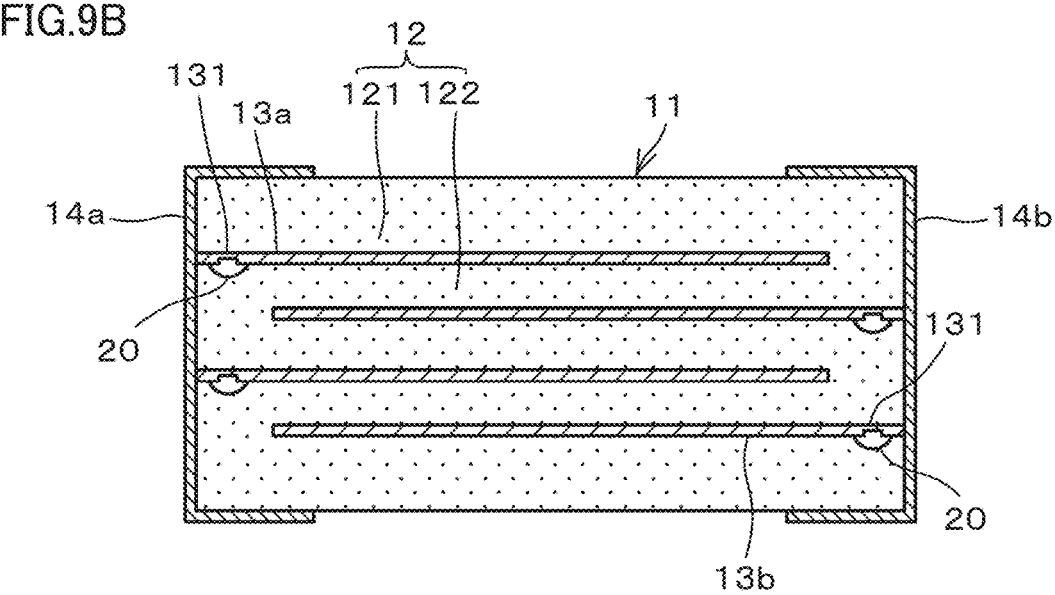

Subsequently, the product after firing is turned upside down such that the cavity 20 is located vertically below the thin portion 131 of the internal electrode 13 (see FIG. 9B).

Figure 9C:
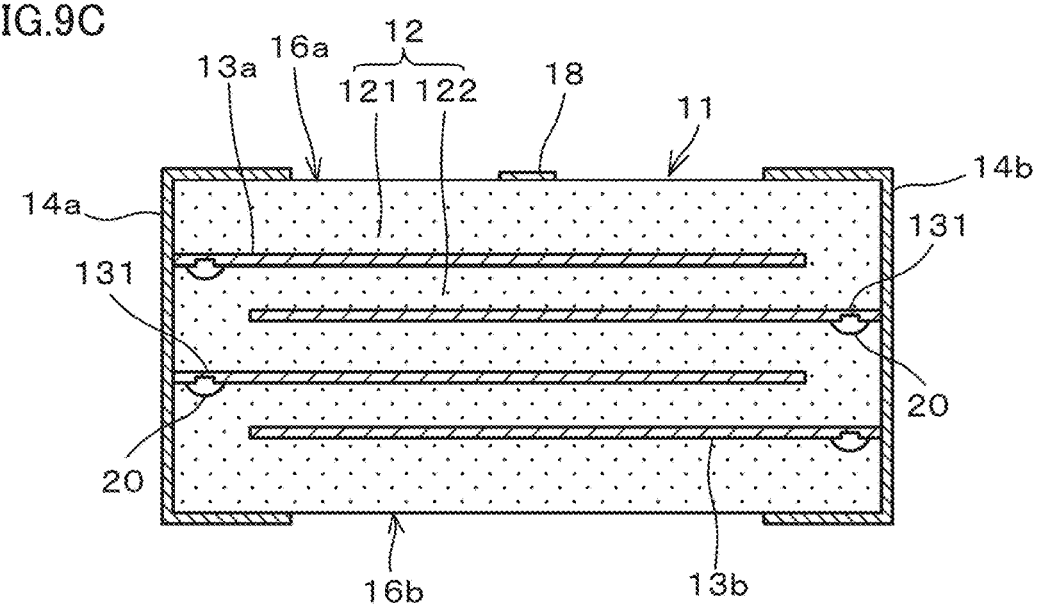

Finally, the identifier 18 is formed on the first main surface 16a of the stack 11 (see FIG. 9C). The identifier 18 is preferably formed by, for example, ink-jet printing. As described above, since the identifier 18 is provided to indicate the positional relationship between the cavity 20 and the thin portion 131 of the internal electrode 13 in the stacking direction T, the shape and constituent material of the identifier 18 are not particularly limited.

Multilayer ceramic capacitor 10 is manufactured through the steps described above.

Preferred Embodiment 2

In multilayer ceramic capacitor 10 in Preferred Embodiment 1, a groove 30 extending in width direction W is provided in internal electrode 13, and a thin portion 131 is provided at the position at which groove 30 is provided. The groove 30 has a constant or substantially constant depth irrespective of positions.

Contrastingly, in a multilayer ceramic capacitor 10 according to a Preferred Embodiment 2 of the present invention, a groove 30 extending in a width direction W is provided in an internal electrode 13, the groove 30 includes a portion with a depth the same or substantially the same as the thickness of internal electrode 13 and a portion with a depth smaller than the thickness of internal electrode 13, and the thin portion 131 is provided at the portion with a depth smaller than the thickness of the internal electrode 13. Also in the present preferred embodiment, the thin portion 131 corresponds to the melting trigger portion of the present invention.

The external appearance of multilayer ceramic capacitor in Preferred Embodiment 2 is preferably the same or substantially the same as the external appearance of the multilayer ceramic capacitor 10 in Preferred Embodiment 1 shown in FIG. 1.

Figure 10:
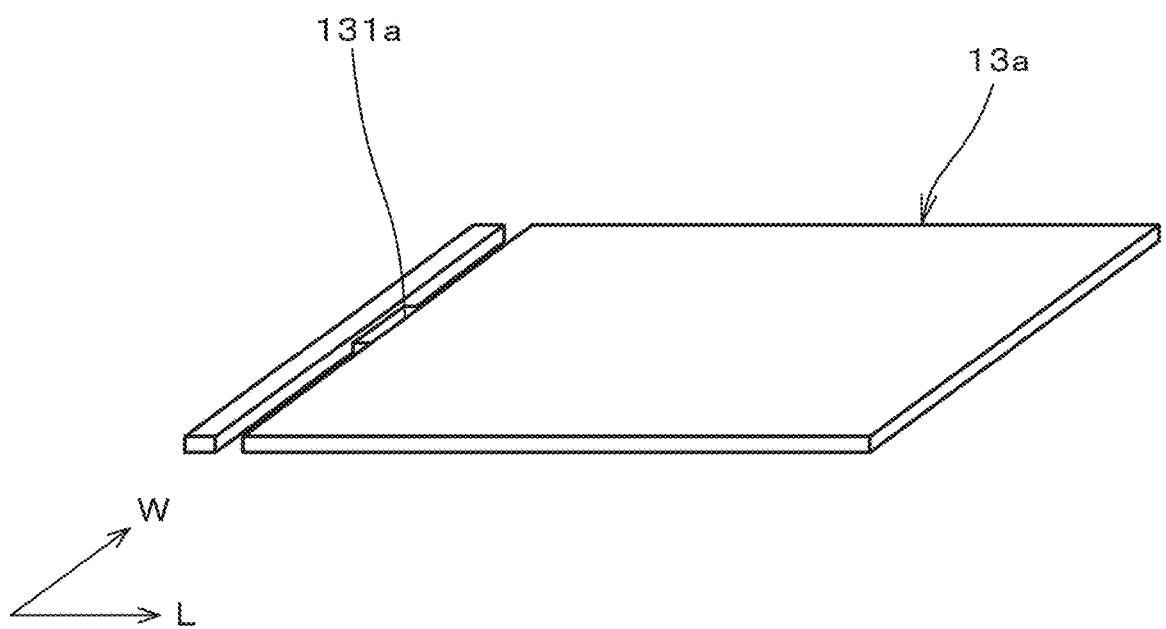
FIG. 10 is a perspective view of an internal electrode of a multilayer ceramic capacitor according to a Preferred Embodiment 2 of the present invention.

FIG. 10 is a perspective view of the internal electrode 13a of the multilayer ceramic capacitor 10 in Preferred Embodiment 2. Although the internal electrode 13a is provided with the groove in width direction W, the depth of the groove 30 varies depending on positions. That is to say, the groove 30 includes a portion with a depth the same or substantially the same as the thickness of the internal electrode 13 and a portion with a depth smaller than the thickness of the internal electrode 13.

In the present preferred embodiment, the portion of the groove 30, which has a depth smaller than the thickness of the internal electrode 13, is provided at the central portion in width direction W, and thin portion 131 is provided at this portion.

The portion of the groove 30, which has a depth the same or substantially the same as the thickness of the internal electrode 13, is formed on opposite outer sides of the thin portion 131 in the width direction W. That is to say, no internal electrode is located on the opposite outer sides of the thin portion 131 in the width direction W.

With the above configuration, the internal electrode 13 is more likely to be broken at the thin portion 131 in the multilayer ceramic capacitor 10 in Preferred Embodiment 2 than in the multilayer ceramic capacitor 10 in Preferred Embodiment 1. Thus, the thin portion 131 can be intentionally broken when acoustic noise increases due to vibrations of the multilayer ceramic capacitor 10.

In a conventional electronic component, when acoustic noise occurs, dirt may be caused at the portion at which a multilayer ceramic capacitor is mounted and therearound, because the mounted multilayer ceramic capacitor would come off or the surface on which the multilayer ceramic capacitor is mounted would be broken. In the multilayer ceramic capacitor 10 in the present preferred embodiment, however, only the thin portion 131 of the internal electrode 13 is broken, which can reduce or prevent the generation of dirt outside the multilayer ceramic capacitor 10.

Preferred Embodiment 3

In a multilayer ceramic capacitor 10 according to a Preferred Embodiment 3 of the present invention, the melting trigger portion of the internal electrode 13 is made of a material having a melting point lower than that of any other portion of the internal electrode 13.

The external appearance of multilayer ceramic capacitor in Preferred Embodiment 3 is preferably the same or substantially the same as the external appearance of the multilayer ceramic capacitor 10 in Preferred Embodiment 1 shown in FIG. 1.

Figure 11:
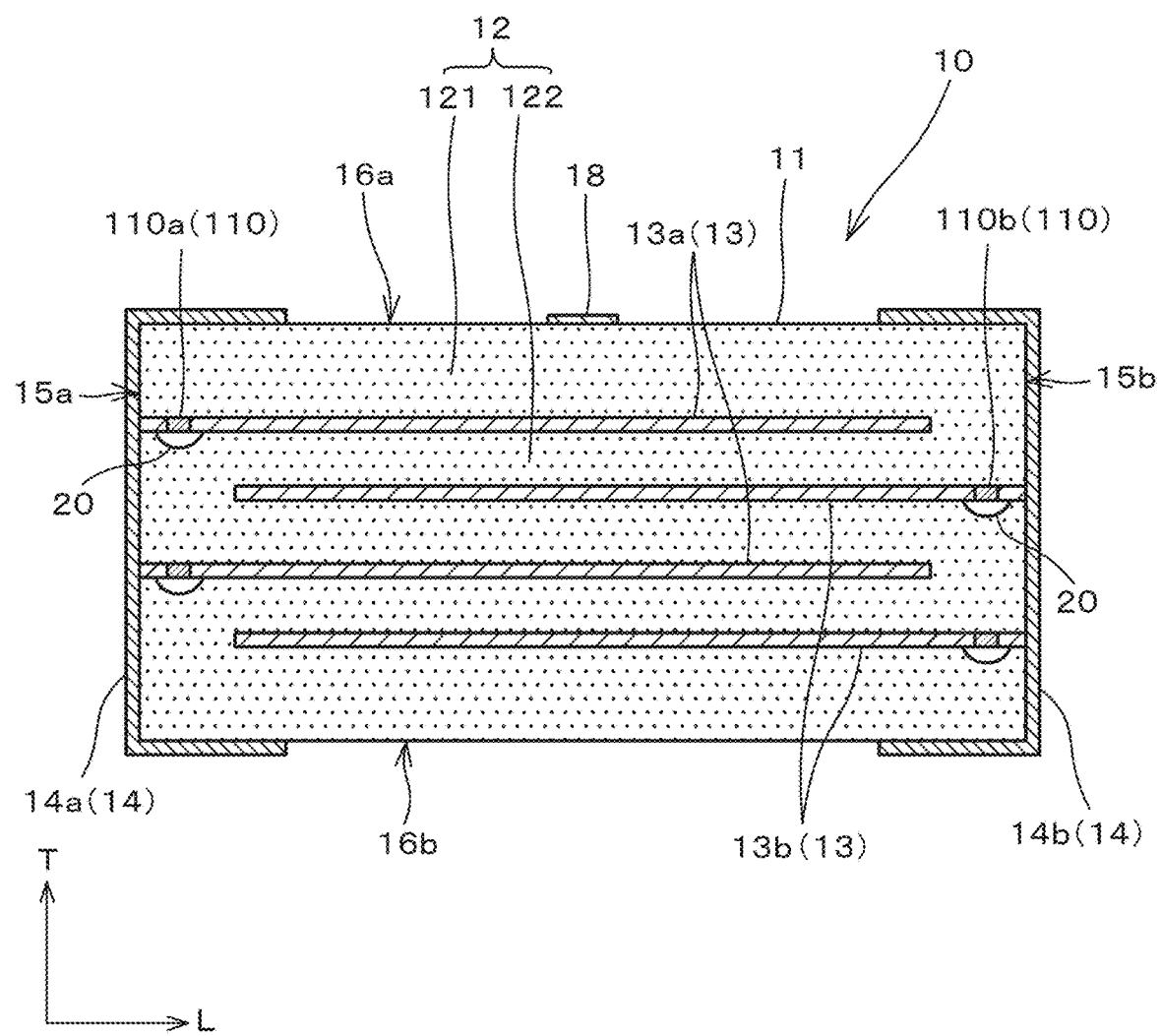
FIG. 11 schematically shows a cross-section of a multilayer ceramic capacitor according to a Preferred Embodiment 3 of the present invention.

FIG. 11 schematically shows a cross-section of the multilayer ceramic capacitor 10 in Preferred Embodiment 3. FIG. 11 is a sectional view taken along the line II-II in FIG. 1 as in FIG. 2.

The first internal electrode 13a preferably includes a first melting trigger portion 110a. The position at which the first melting trigger portion 110a is provided is the same or substantially the same as the position at which the first thin portion 131a is provided in the multilayer ceramic capacitor 10 in Preferred Embodiment 1.

The second internal electrode 13b includes a second melting trigger portion 110b. The position at which the second melting trigger portion 110b is provided is preferably the same or substantially the same as the position at which the second thin portion 131b is provided in the multilayer ceramic capacitor 10 in Preferred Embodiment 1.

In the internal electrode 13, the melting point of the melting trigger portion 110 is lower than the melting point of any other portion of the internal electrode 13. That is to say, the melting trigger portion 110 is made of a material having a melting point lower than that of any other portion of the internal electrode 13. The melting point of the melting trigger portion 110 is preferably lower than the melting point of any other portion by, for example, about 500° C.

In manufacturing of the multilayer ceramic capacitor 10 in Preferred Embodiment 3, it suffices that, in the formation of an unfired internal electrode layer, printing is performed with ink including a material having a melting point lower than that of any other portion, at the portion that turns into the melting trigger portion 110 after firing.

In the multilayer ceramic capacitor 10 in Preferred Embodiment 3, when a short-circuit occurs between the first internal electrode 13a and the second internal electrode 13b adjacent to each other in the stacking direction T, overcurrent flows to increase the temperature of the internal electrode 13, and the melting trigger portion 110 having a melting point lower than that of any other portion melts earlier than any other portion. Then, the melted portion drops into the cavity 20 located directly below. This can restrain the occurrence of another conduction and an electric discharge at the position of melting, as in multilayer ceramic capacitor 10 in Preferred Embodiment 1.

The present invention is not limited to the above preferred embodiments and can be applied and modified in various manners within the scope of the present invention.

For example, although the above preferred embodiments have described the configuration in which the thin portion 131 is provided in every one of the internal electrodes 13, the thin portion 131 may be provided at any one of the internal electrodes 13. In this case, the number of the internal electrodes 13 in which the thin portion 131 is provided may be adjusted such that the capacitance after flowing of overcurrent and melting of the thin portion 131 attains to a predetermined capacitance. For example, the number of the internal electrodes 13 in which the thin portion 131 is provided can be made a half of all the internal electrodes 13 to make the capacitance after melting of the thin portion 131 a half of the capacitance before melting of the thin portion 131.

The multilayer ceramic capacitors 10 in Preferred Embodiment 1 and Preferred Embodiment 2 may be configured such that the thin portion 131 is made of a material having a melting point lower than that of any other portion. In this case, when a short-circuit occurs between the first internal electrode 13a and the second internal electrode 13b adjacent to each other in stacking direction T, the thin portion 131 can be caused to melt earlier than any other portion to be disconnected.

It suffices that the identifier 18 is any identifier by which the positional relationship between the cavity 20 and the thin portion 131 of the internal electrode 13 in stacking direction T can be determined. For example, a part of the portion of the first external electrode 14a, which is on the first main surface 16a of the stack 11, may be shaped to project toward the second external electrode 14b such that the first main surface 16a can be determined. In this case, the projecting portion of the first external electrode 14a is the identifier 18.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component, comprising:
   a stack including a plurality of ceramic layers and a plurality of internal electrodes stacked alternately; and
   a plurality of external electrodes provided on a surface of the stack and electrically connected to the internal electrodes; wherein
   each of the internal electrodes includes a melting trigger portion that melts earlier than any other portion of the internal electrodes;
   each of the ceramic layers adjacent to a corresponding one of the internal electrodes including the melting trigger portion includes a cavity, the cavity being provided at a position at which the cavity overlaps the melting trigger portion at least partially in a stacking direction of the internal electrodes, the cavity being open on a melting trigger portion side; and
   a surface of at least one of the stack and the external electrodes is provided with an identifier that defines and functions as a marker indicating use of the ceramic electronic component with the cavity vertically below the melting trigger portion.

2. The ceramic electronic component according to claim 1, wherein
   the stack includes:
      a first main surface and a second main surface extending in a length direction and a width direction;
      a first lateral surface and a second lateral surface extending in the length direction and the stacking direction; and
      a first end surface and a second end surface extending in the width direction and the stacking direction;
   the internal electrodes include:
      a first internal electrode drawn out to the first end surface; and a second internal electrode drawn out to the second end surface;

the external electrodes include:
- a first external electrode provided on the first end surface and electrically connected to the first internal electrode; and
- a second external electrode provided on the second end surface and electrically connected to the second internal electrode; and the melting trigger portion is provided at a position at which the first internal electrode and the second internal electrode do not overlap each other in the stacking direction.

3. The ceramic electronic component according to claim 1, wherein the melting trigger portion of each of the internal electrodes is a thin portion thinner than any other portion of the internal electrodes.

4. The ceramic electronic component according to claim 3, wherein each of the internal electrodes includes a groove extending in a width direction, and the thin portion is provide at a position at which the groove is provided.

5. The ceramic electronic component according to claim 3, wherein each of the internal electrodes includes a groove extending in the width direction, and the groove includes a first portion having a depth the same or substantially the same as a thickness of each of the internal electrodes and a second portion having a depth smaller than the thickness of each of the internal electrodes, and the thin portion is defined at the second portion.

6. The ceramic electronic component according to claim 1, wherein the melting trigger portion of each of the internal electrodes is made of a material having a melting point lower than that of any other portion of the internal electrodes.

7. The ceramic electronic component according to claim 1, wherein a surface of each of the ceramic layers defining the cavity has a curved shape.

8. The ceramic electronic component according to claim 1, wherein
- each of the ceramic layers is a ceramic dielectric layer; and
- the ceramic electronic component is a multilayer ceramic capacitor.

9. A method of manufacturing a ceramic electronic component according to claim 1, the method including producing an unfired stack by ink-jet printing and firing the produced unfired stack to produce the stack, the method comprising:

forming, by printing with ink to make a ceramic layer, an unfired ceramic layer that turns into the ceramic layer after firing;

forming, by printing with ink to make an internal electrode, an unfired internal electrode layer that turns into the internal electrode after firing such that the unfired internal electrode layer includes a portion that turns into the melting trigger portion after firing; and forming, by printing with disappearing ink, a disappearing portion on the portion of the unfired internal electrode layer that turns into the melting trigger portion after firing, the disappearing ink including a disappearing material that disappears by firing; wherein the formation of the unfired ceramic layer, the formation of the unfired internal electrode layer, and the formation of the disappearing portion are repeated to produce the unfired stack, and the produced unfired stack is fired to produce the stack.

10. The ceramic electronic component according to claim 1, wherein the melting trigger portion of each of the internal electrodes is provided at a location that does not overlap an adjacent one of the internal electrodes in the stacking direction of the internal electrodes.

11. The ceramic electronic component according to claim 1, wherein a ratio of a total thickness of the melting trigger portion with respect to a total thickness of remaining portions of the internal electrodes is from about 10% or more to about 50% or less.

12. The ceramic electronic component according to claim 4, wherein the groove has a constant or substantially constant depth in the stacking direction of the internal electrodes irrespective of its position in the width direction.

13. The ceramic electronic component according to claim 4, wherein the groove has a rectangular or substantially rectangular cross-sectional shape when viewed along the width direction.

14. The ceramic electronic component according to claim 4, wherein a dimension of the groove in a length direction perpendicular or substantially perpendicular to the width direction gradually decreases when moving in the stacking direction.

15. The ceramic electronic component according to claim 1, wherein the identifier is provided on an outer surface of the stack and the cavities are defined by channels which open up in the stacking direction toward the identifier.

* * * * *